Oct. 21, 1924.

J. ASTROM 1,512,517

JACKET HEATER FOR INTERNAL COMBUSTION ENGINES

Filed Jan. 27, 1922 — 2 Sheets-Sheet 1

Witness:
Erwin B. Eiring

Inventor:
John Astrom
By Henry Young
Attorneys

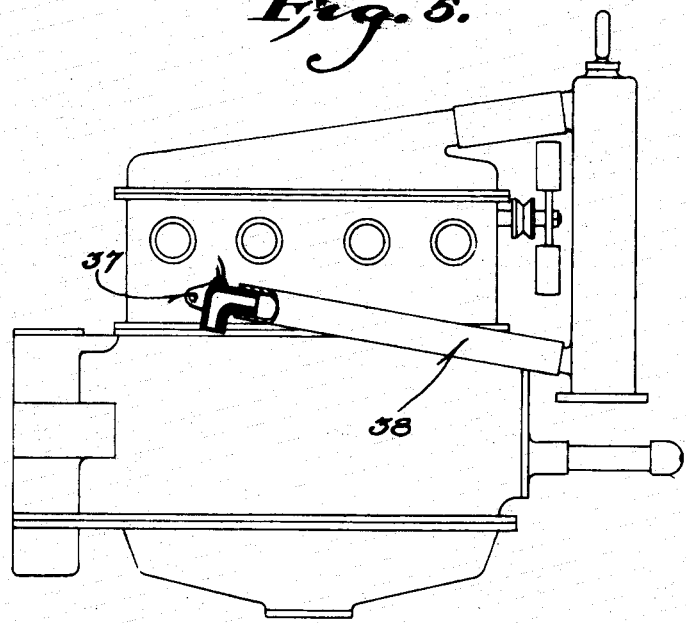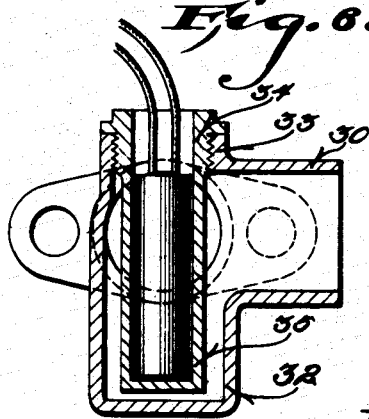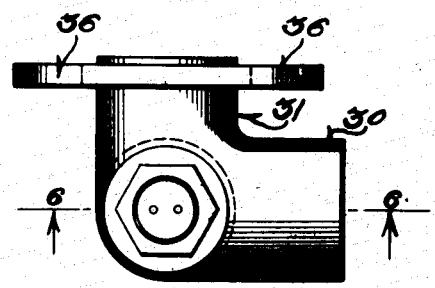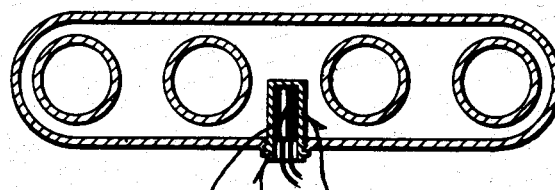

Patented Oct. 21, 1924.

1,512,517

UNITED STATES PATENT OFFICE.

JOHN ASTROM, OF FORT WAYNE, INDIANA.

JACKET HEATER FOR INTERNAL-COMBUSTION ENGINES.

Application filed January 27, 1922. Serial No. 532,157.

*To all whom it may concern:*

Be it known that I, JOHN ASTROM, a citizen of the United States, and resident of Fort Wayne, in the county of Allen and State of Indiana, have invented certain new and useful Improvements in Jacket Heaters for Internal-Combustion Engines; and I do hereby declare that the following is a full, clear, and exact description thereof.

The invention relates to a jacket heater for internal combustion engines. In general, most internal combustion engines are water-jacketed for the purpose of cooling the engines. The cylinders, and generally, also, the cylinder heads, are surrounded by a jacket space filled with water, which absorbs a part of the heat produced in the cylinders and heads. The heated water ascends, and through a suitable tubular connection, enters the top of a radiator provided for the purpose of cooling the water in passing therethrough. The cooled water descends to the bottom of the radiator and from there, through another tubular connection, reenters the cylinder jacket at a low point and is again heated by the engine. A constant circulation of the cooling water is thus maintained either by the generated heat alone, or assisted by a circulating pump driven by the engine.

Such a cooling system has the disadvantage that in freezing temperature, the jacket water, when the engine is not in operation, cools down and freezes unless its freezing point is lowered by the addition of alcohol or other liquid of similar properties. The maintenance of a proper anti-freezing mixture requires constant attention.

If an engine is allowed to cool off to a low temperature, the oil becomes thick and the lubrication poor, causing excess friction. To start an engine, in that condition, requires considerable power, and if the starting is done by an electric motor run from batteries, as is usual, these are severely taxed and liable to run down. In order to start a cool engine, a mixture of gas rich in gasoline or fuel must be used. Some of the fuel will condense in contact with the cool metal in cylinder walls and heads and often short circuits the spark plugs or passes by the contracted pistons into the crank case, where it mixes with the lubricating oil, which is very undesirable.

The water cooling system of the prior art is, also, very disadvantageous in that when the water or cooling medium is allowed to become very cold, it takes a long time for the engine to warm it up to a point at which the engine will run normally and economically.

Also, when a cool engine is started, the intense heat suddenly produced by the exploding gas, heats up only the exposed parts of the metal, while the more removed parts are still cool, causing uneven expansion and internal stresses in the metal, loosening up of joints, and, in general, contributing to the deterioration of the engine.

These well recognized troubles can be avoided only by maintaining the engine at a reasonably high temperature at which the engine will start up easily and the cooling water will not freeze. The purpose of my invention is to accomplish this object in a simple, economical manner, by introducing an electrical heating unit into the cooling water system at a convenient point, thereby converting the cooling system into a hot water heating system, which maintains a desired temperature of the jacket water and thereby of the engine itself.

The jacket heater comprises a casting adapted to be received into a water tube, a heating unit, and a pocket member threaded in the casting for securing the heating unit in position to act on the water. Objects in the construction of the jacket heater are the making of a structure, the parts of which may be readily assembled, which may be put in place conveniently, which will be secure and not subject to damage by vibration, and the parts of which are simple and easy to manufacture.

With the above and other objects in view, which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention, constructed according to the best mode I have so far devised for the practical application of the principles thereof, and in which:

Figure 5 is a side elevation similar to Figure 1, showing a modified form of jacket heater in place.

Figure 6 is a central, vertical section of this type of heater taken on the line 6—6 of Figure 7.

Figure 7 is a plan thereof, and

Figure 8 is a horizontal cross section of an alternative form of jacket heater in position.

Figure 2:
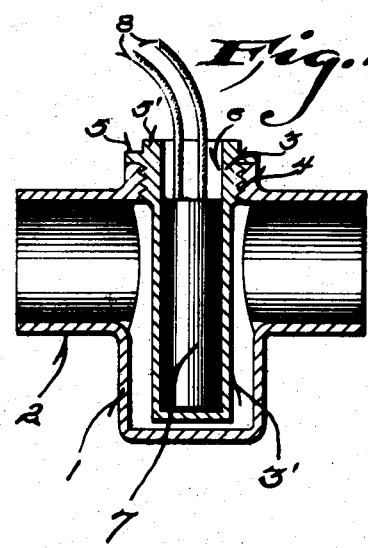
Figure 2 is a central, vertical section of a jacket heater taken on the line 2—2 of Figure 4.

Referring to the accompanying drawing, Figure 2 shows a convenient form of a jacket heater according to my invention. Into a cylindrical body 1 having two tubular extensions 2, a cap 3 on pocket member 3' is secured in watertight connection by means of the thread 4 and flange 5, above which is a hexagonal extension 5' adapted to be gripped with a wrench. The pocket 6 has the form of a cylindrical hole into which an electric heating unit 7, also of cylindrical form, is snugly, but removably, fitted. The heating unit is of the common cartridge type and has wire connections 8 for connecting same to the available electric circuit in the customary manner. Extensions 2 are carried by tube 9 supported on radiator outlet 9' and tube 9'' supported on casting 9'''.

Figure 1:
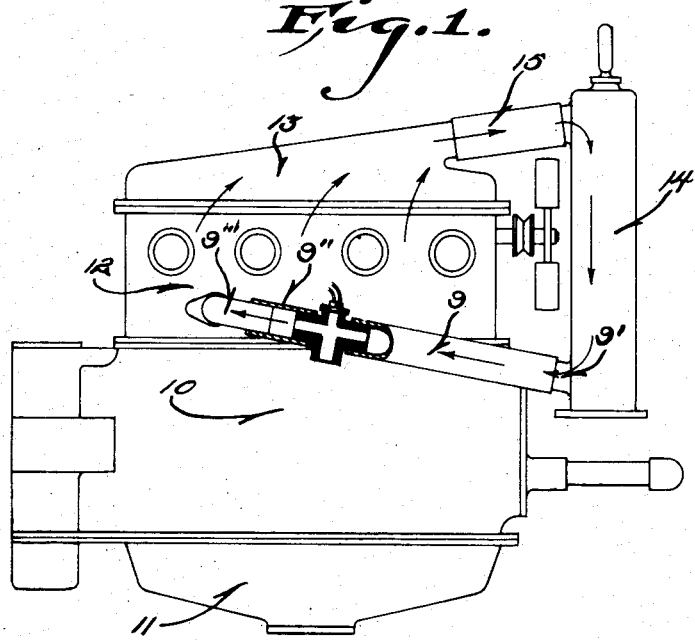
Figure 1 is a side elevation of the engine with the jacket heater in position, the tube being partly in section.

Figure 1 shows an engine of conventional design having a crank case 10 with oil pan 11, water-jacketed cylinders 12 cast en bloc and cylinder head 13 forming a water-jacket over the cylinders and communicating with the cylinder jacket. The cylinder head 13 is in communication with a radiator 14 through a tube 15 and the radiator 14 is in communication with the cylinder jacket 12 through a tube 9 into which the jacket heater, Figure 1, is fitted as shown.

The operation of the jacket heater is as follows:

Upon connecting the wires 8 with the power circuit, the heat generated by the heating unit 7 is transmitted through the walls of the pocket member 3 to the surrounding water which thereby is put into circulation, the heated water seeking a passage to the highest point or into the cylinder jacket and from there into the cylinder head jacket 13, through the tube 15 into the radiator 14, as indicated by the arrowmarks. As the heated water ascends, cold water is drawn from the radiator into tube 9, completing the circuit. The heating of the jacket water and the engine goes on until a point is reached at which the radiation from the engine equals the amount of heat supplied by the jacket heater and the temperature at which this point is reached depends upon the temperature of the surrounding air and upon the capacity of the heating unit which can be regulated to obtain any desired degree of heat.

Figure 3:
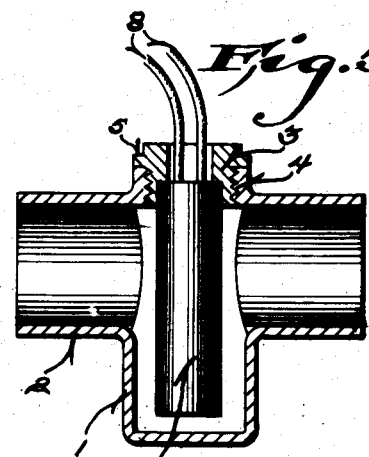
Figure 3 is a central, vertical section of a modification of jacket heater.
Figure 4:
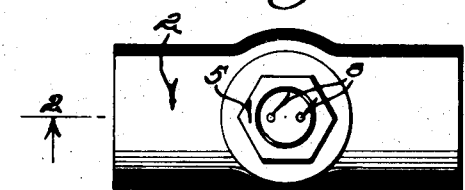
Figure 4 is a plan view of the jacket heater shown in Figure 2.

Figure 3 shows the heater as arranged to utilize a direct immersion heating unit and therefore has the pocket member 3 omitted, the heating unit instead being secured to threaded part thereof.

It is not necessary to apply the jacket heater to the tube 9, but where convenience dictates, a different arrangement may be made.

In Figures 5, 6, and 7, an alternative form of jacket heater is shown, provided with extensions 30 and 31, a well member 32 integral therewith, a nipple 33, cap 34, and pocket member 35. Ears 36 are provided on extension 31 adapted to be secured to the engine by bolts 37. In this form, the pocket member 35 may, also, be omitted. Extension 30 is received in tube 38, as shown in Figure 5.

In the modification shown in Figure 8, heating unit 39 is positioned in pocket member 40 integral with cap 41, which is applied directly to the cylinder jacket casting threaded for its reception. In this modification, obviously, the water contacting with pocket member 40 is heated and rises, cold water taking its place, a general heating action resulting.

As above remarked, the various methods of application of heat referred to, are capable of diverse modifications. It is pointed out that the shape and design of the heating unit may be considerably varied by one skilled in the art.

I claim:—

A water heater adapted for insertion in the cooling system of an internal combustion engine, said heater comprising a tubular body portion having inlet and outlet members adapted for connection to such cooling system, a pocket formed on one side of said body portion, a threaded aperture on the other side thereof aligning with said pocket, a tubular plug having a threaded portion adapted to cooperate with said threaded aperture and having a portion projecting transversely of said body portion and extending into the pocket of said body portion, and an electrical heating unit removably positioned within said tubular plug.

In testimony that I claim the foregoing I have hereunto set my hand at Fort Wayne, in the county of Allen and State of Indiana.

JOHN ASTROM.